(12) United States Patent
De Oliveira et al.

(10) Patent No.: US 12,291,342 B2
(45) Date of Patent: May 6, 2025

(54) AIRCRAFT PROPULSION SYSTEM COMPRISING A NACELLE EQUIPPED WITH AN IMPROVED ARTICULATION SYSTEM

(71) Applicant: Airbus Operations SAS, Toulouse (FR)

(72) Inventors: Grégory De Oliveira, Toulouse (FR); Thomas Bourdieu, Toulouse (FR); Julien Ferreira, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/411,190

(22) Filed: Jan. 12, 2024

(65) Prior Publication Data

US 2024/0239508 A1  Jul. 18, 2024

(30) Foreign Application Priority Data

Jan. 16, 2023  (FR) ...................................... 2300371

(51) Int. Cl.
*B64D 29/06* (2006.01)
(52) U.S. Cl.
CPC .................................... *B64D 29/06* (2013.01)
(58) Field of Classification Search
CPC ............ B64D 29/06; B64D 29/08; E05D 3/12
See application file for complete search history.

(56) References Cited

U.S. PATENT DOCUMENTS

| | | | | |
|---|---|---|---|---|
| 4,854,010 A | * | 8/1989 | Maraghe | E05D 3/18 49/248 |
| 6,175,991 B1 | * | 1/2001 | Driesman | E05D 3/147 296/146.12 |
| 7,059,655 B2 | * | 6/2006 | Ham | E05D 3/127 296/146.12 |
| 7,596,831 B2 | * | 10/2009 | Faubert | E05D 3/18 16/334 |
| 2019/0284856 A1 | | 9/2019 | Geliot et al. | |
| 2021/0190005 A1 | | 6/2021 | Caruel et al. | |
| 2024/0360711 A1 | * | 10/2024 | Hatano | G06F 1/1681 |

FOREIGN PATENT DOCUMENTS

DE  687496 C  1/1940

OTHER PUBLICATIONS

French Search Report for corresponding French Patent Application No. 2300371 dated Jun. 29, 2023.

* cited by examiner

*Primary Examiner* — Brian M O'Hara
(74) *Attorney, Agent, or Firm* — Greer, Burns & Crain, Ltd.

(57) ABSTRACT

A propulsion system comprising a chassis, a fan cowl, an articulation system fixed between the chassis and the fan cowl and comprising a shaft with two offset cylinders in which a central cylinder is movably mounted in rotation on the chassis and wherein a lateral cylinder is movably mounted in rotation on the fan cowl, a blocking device limits the rotation of the central cylinder relative to the chassis between a closed position and an intermediate position, and a stopping device allows rotation of the fan cowl between the intermediate position and the open position and preventing rotation of the fan cowl beyond the intermediate position.

3 Claims, 5 Drawing Sheets

AIRCRAFT PROPULSION SYSTEM COMPRISING A NACELLE EQUIPPED WITH AN IMPROVED ARTICULATION SYSTEM

CROSS-REFERENCES TO RELATED APPLICATIONS

This application claims the benefit of French Patent Application Number 2300371 filed on Jan. 16, 2023 the entire disclosure of which is incorporated herein by way of reference.

FIELD OF THE INVENTION

The present invention relates to an aircraft propulsion system comprising a chassis, a nacelle with two fan cowls and, for each one, an articulation system mounted on the chassis to articulate the fan cowl. The invention likewise relates to an aircraft comprising a propulsion system of this kind.

BACKGROUND OF THE INVENTION

An aircraft comprises a fuselage with a wing fixed on each side. At least one propulsion system, such as a dual-flow turbojet, is suspended under each wing. Each propulsion system comprises a chassis, a core that constitutes the engine and a nacelle that surrounds the core, where the core and the nacelle are fixed to the chassis.

The propulsion system is fixed beneath the wing by means of a pylon that is fixed between the wing structure and the chassis.

The nacelle comprises, among other things, cowls mounted on the chassis and, in the case of a dual-flow turbojet, the nacelle comprises from front to rear, an air inlet cowl, two fan cowls and rear cowls. The air inlet cowl defines the inlet of the nacelle, through which air that feeds the core is introduced. The fan cowls surround a fan that draws air from the inlet of the nacelle and sends it towards the core. The rear cowls cover the rear of the core up to the exhaust nozzle.

The two fan cowls are mounted in an articulated manner on the chassis by means of hinges, the axes of which are generally parallel to the longitudinal axis of the propulsion system. In the upper part of the nacelle, the two fan cowls may be jointed to one another or separated from one another by a fixed cowl.

Although an arrangement of this kind is satisfactory, interactions can occur between the two fan cowls or between a fan cowl and the fixed cowl during the opening or closing of a fan cowl. In order to limit these interactions, it is known in the art for the cowls to be separated to leave a significant functional clearance between them.

It is therefore necessary to find an arrangement that allows these interactions, among others, to be prevented, limits the clearance between the various cowls and thereby reduces parasitic drag.

SUMMARY OF THE INVENTION

An object of the present invention is to propose an aircraft propulsion system comprising a chassis, a nacelle with two fan cowls and, for each one, a particular articulation system mounted on the chassis to articulate the fan cowl.

To this end, a propulsion system for an aircraft is proposed, said propulsion system comprising:

a chassis, a nacelle comprising two fan cowls, for each fan cowl, at least one articulation system fixed between the chassis and said fan cowl, so as to move said fan cowl between a closed position and an open position, and vice versa, and for each fan cowl, a locking means arranged to assume, alternately, a locked position in which it ensures the locking of said fan cowl on the chassis in the closed position and an unlocked position in which it does not ensure the locking of said fan cowl on the chassis, in which each articulation system comprises:

a shaft comprising a central cylinder with an axis and at least one lateral cylinder, each with an axis, in which the central cylinder is movably mounted in rotation on the chassis about its axis, in which said at least one lateral cylinder is movably mounted in rotation on the fan cowl about its axis and in which the axes of said at least one lateral cylinder are coaxial and parallel but distinct from the axis of the central cylinder, blocking means arranged to limit the rotation of the central cylinder relative to the chassis between a first position corresponding to the closed position of the fan cowl and a second position corresponding to an intermediate position of the fan cowl in which the fan cowl is laterally offset from the side corresponding to said fan cowl, and stopping means arranged to allow rotation of the fan cowl relative to said at least one lateral cylinder between a first position corresponding to the intermediate position of the fan cowl and a second position corresponding to the open position of the fan cowl and to prevent the rotation of the fan cowl beyond the intermediate position when moving from the open position, wherein the blocking means consist of a first blade integral with the shaft and two first pins integral with the chassis, wherein the two first pins are arranged on either side of the first blade, wherein one of the first pins is arranged in such a manner that the first blade abuts against it in the closed position of the fan cowl and wherein the other of the first pins is arranged in such a manner that the first blade abuts against it in the intermediate position of the fan cowl.

With an arrangement of this kind, the fan cowl moves laterally from when it starts opening, allowing said fan cowl to move away from the neighboring cowl, mitigate the risk of interactions and reduce parasitic drag.

Advantageously, the stopping means consist of a second blade integral with the shaft and a second pin integral with the fan cowl and the second pin is arranged in such a manner that the second blade abuts against it in the intermediate position of the fan cowl.

The invention likewise provides an aircraft comprising at least one propulsion system according to any of the preceding variants.

BRIEF DESCRIPTION OF THE DRAWINGS

The features of the invention referred to above, as well as others, will become clearer upon reading the following description of an exemplary embodiment, said description being given in relation to the accompanying drawings, in which.

DETAILED DISCLOSURE OF THE PREFERRED EMBODIMENTS

Figure 1:
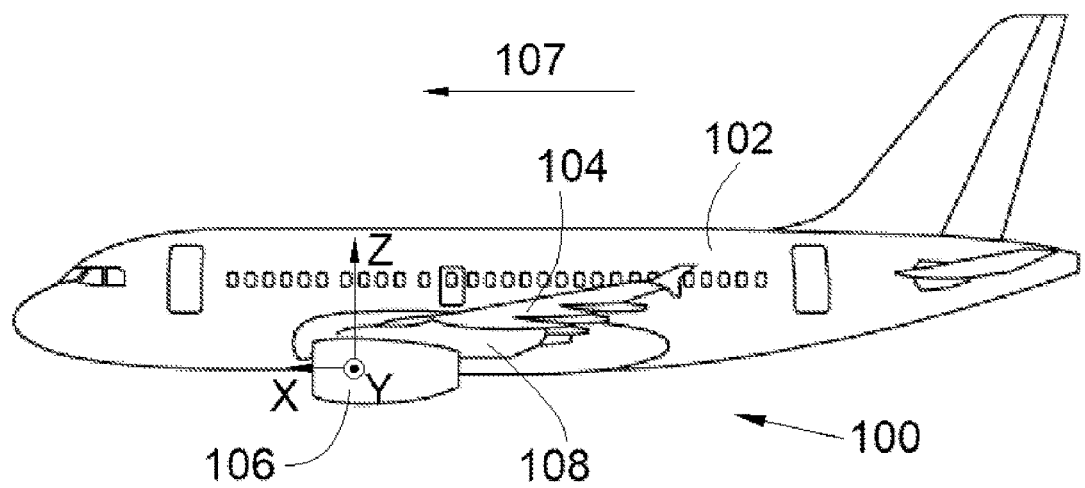
FIG. 1 is a side view of an aircraft according to the invention.

In the following description, terms relating to a position are taken with reference to an aircraft in the forward position as depicted in FIG. 1.

FIG. 1 shows an aircraft 100 that comprises a fuselage 102, to each side of which is fixed a wing 104 that carries at least one propulsion system 106, such as a dual-flow turbojet, which is fixed beneath the wing 104 by means of a pylon 108.

Figure 2:
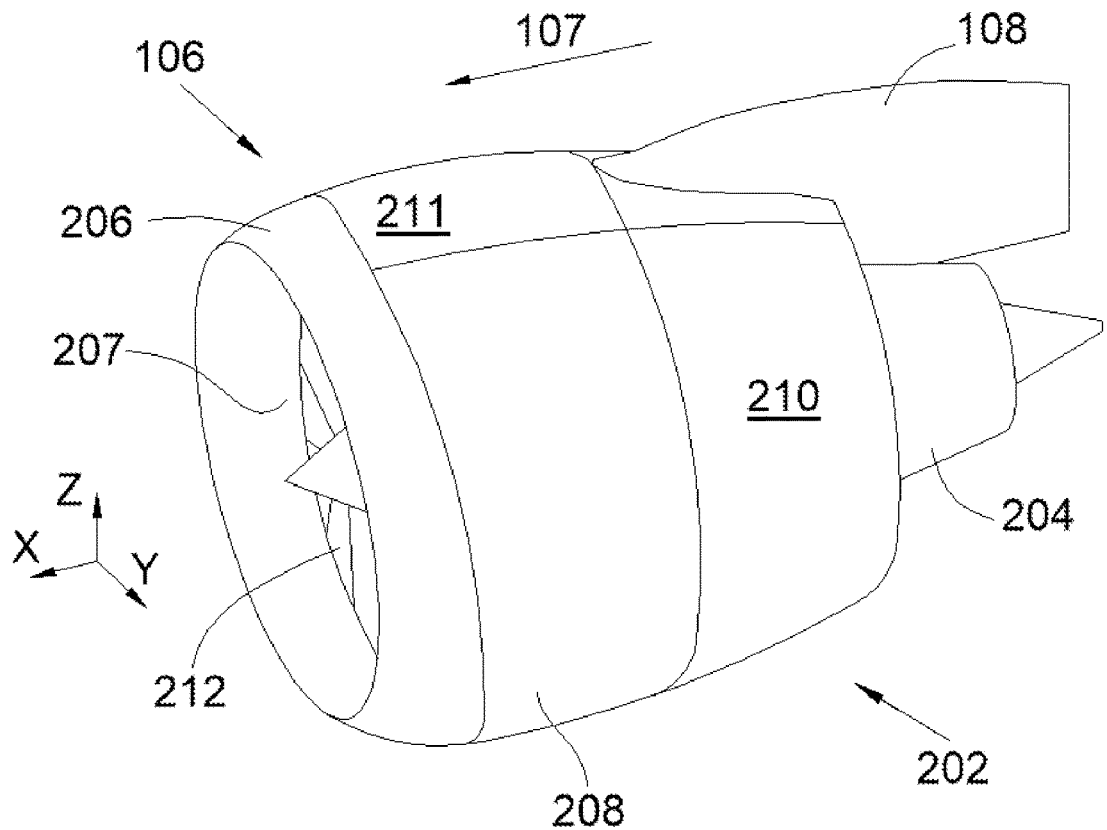
FIG. 2 is a perspective view of a propulsion system according to the invention.

FIG. 2 shows the propulsion system 106 exhibiting a nacelle 202 and a core constituting the engine 204 and housed inside the nacelle 202. The propulsion system 106 likewise comprises a chassis (402, FIG. 3) to which the engine 204 and the nacelle 202, among other things, are fixed. The engine 204 is represented here by the exhaust nozzle.

In the following description, and by convention, X is called the longitudinal axis of the nacelle 202, which corresponds to the longitudinal axis of the propulsion system 106 and is parallel to the longitudinal axis of the aircraft 100 oriented positively here in the forward direction of the aircraft 100, Y is called the horizontal transverse axis when the aircraft 100 is on the ground and Z is the vertical axis when the aircraft 100 is on the ground, these three directions X, Y, and Z being at right angles to one other.

Arrow 107 represents the forward direction of the aircraft 100 when the propulsion systems 106 are operating. The nacelle 202 likewise exhibits a median plane XZ that is vertical and passes through the longitudinal axis X.

The nacelle 202 comprises, from front to back, an air inlet cowl 206 that surrounds the air inlet 207 on either side of the median plane XZ, two fan cowls 208 and, at the rear of the fan cowls 208, rear cowls 210 that may be the thrust reverser cowls of the propulsion system 106. The air inlet cowls 206 and the rear cowls 210 are fixed to the chassis 402 by any suitable fixing means known to a person skilled in the art. In the embodiment of the invention shown in FIG. 2, the two fan cowls 208 are separated from one another in the upper part of the nacelle 202 by an upper cowl 211, which is likewise fixed to the chassis 402. According to another embodiment of the invention which is not shown, the two fan cowls 208 are adjacent in the upper part of the nacelle 202.

The fan cowls 208 surround a fan 212 that is located across the air inlet 207 of the nacelle 202 and draws air from the air inlet 207 to send it towards the engine 204.

Each fan cowl 208 is mounted in an articulated manner on the chassis 402 between a closed position, in which it is tightened about the engine 204, and an open position, in which it is moved away from the engine 204, and vice versa. The open position allows access to the inside of the nacelle 202.

For each fan cowl 208, the propulsion system 106 likewise comprises a locking means that is arranged to assume, alternately, a locked position in which it ensures the locking of said fan cowl 208 on the chassis 402 in the closed position and an unlocked position in which it does not ensure the locking of said fan cowl 208 on the chassis 402, and the fan cowl 208 is then free to move. The transition from the locked position to the unlocked position, and vice versa, is carried out, for example, by a technician from outside the nacelle 202. The locking means can take the shape of a lock or any form known to a person skilled in the art.

Figure 3:
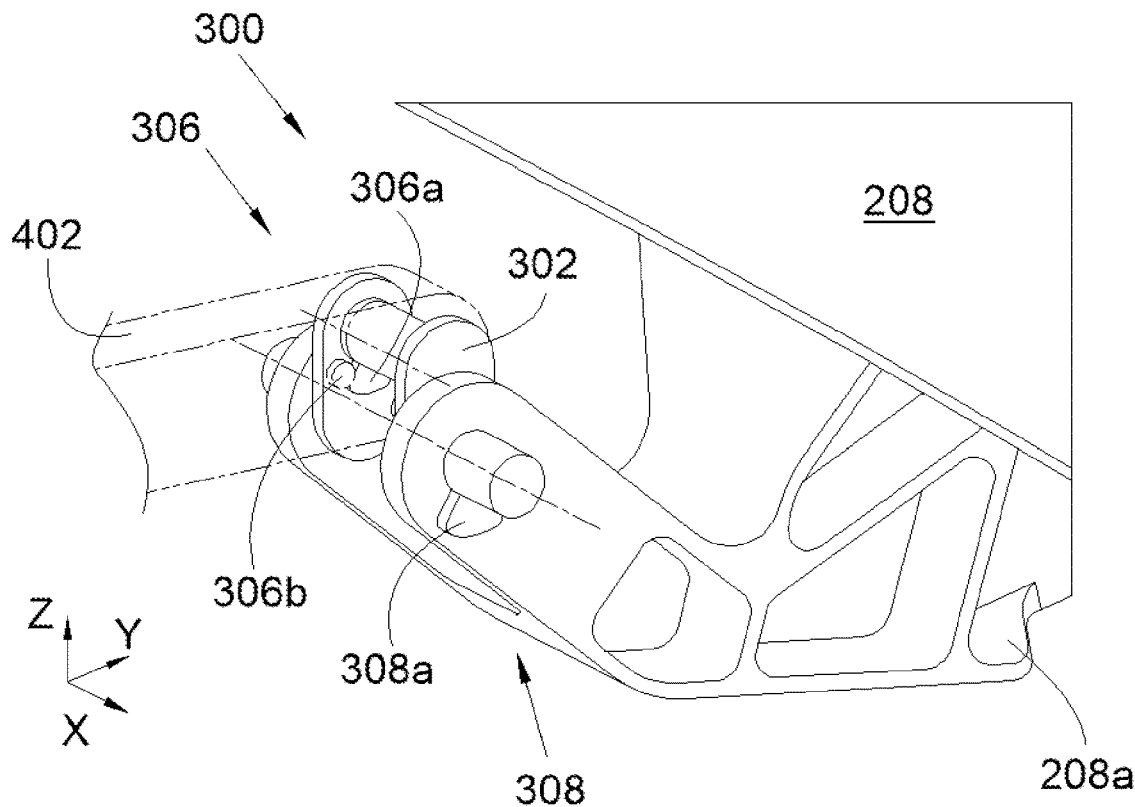
FIG. 3 is a perspective view of an articulation system according to the invention.

As shown in FIG. 3, for each fan cowl 208, the propulsion system 106 comprises at least one articulation system 300 fixed between the chassis 402 and said fan cowl 208, so as to move said fan cowl 208 between the closed position and the open position, and vice versa.

In order to ensure good stability of the fan cowl 208, there are preferably two articulation systems 300 per fan cowl 208, one of which is arranged at the front part of the fan cowl 208 and another of which is arranged at the rear part of the fan cowl 208 along the longitudinal axis X.

Each fan cowl 208 extends angularly over approximately 180° about the longitudinal axis X with an upper end at 12 o'clock and a lower end at 6 o'clock. This angular extent and also the position of the upper end can be varied depending on whether there is an upper cowl 211 or not.

The articulation systems 300 of each fan cowl 208 are arranged proximate to the upper end at 12 o'clock, so as to move to the open position by lifting the fan cowl 208 and the locking means are then positioned at 6 o'clock.

The description of the articulation systems 300 is now provided for a single articulation system 300, but each articulation system 300 of the same fan cowl 208 are preferably identical.

Figure 4:
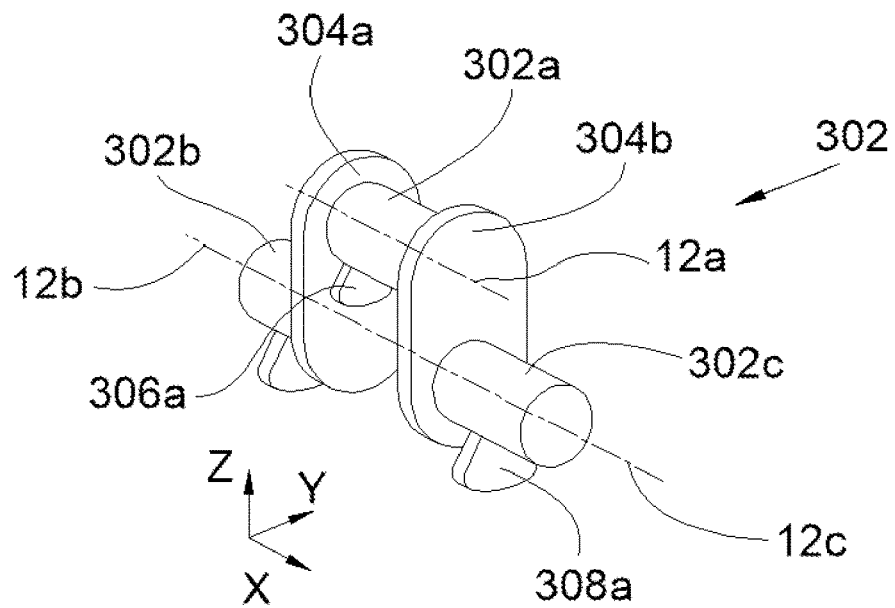
FIG. 4 is a perspective view of a shaft used in the articulation system according to the invention.

The articulation system 300 comprises a shaft 302, one embodiment of which is shown in FIG. 4.

The shaft 302 comprises a central cylinder 302a and at least one lateral cylinder 302b-c.

For balancing reasons, there are two lateral cylinders 302b-c here, arranged on either side of the central cylinder 302a.

The following description is based more particularly on the case in which there are two lateral cylinders 302b-c, but it likewise applies to the case in which there is a single lateral cylinder 302b-c.

The lateral cylinders 302b-c are coaxial with one another and the central cylinder 302a is offset relative to the lateral cylinders 302b-c, in other words, the axes 12b-c of the lateral cylinders 302b-c coincide and the axis 12a of the central cylinder 302a and the axes 12b-c of the lateral cylinders 302b-c are parallel, but distinct.

The three cylinders 302a-c are integral with one another, in this case by means of two plates 304a-b. Hence, the central cylinder 302a and a first lateral cylinder 302b are integral and, in this case, on either side of a first plate 304a and the central cylinder 302a and a second lateral cylinder 302c are integral and, in this case, on either side of a second plate 304b.

The axis 12a-c of each cylinder 302a-c is parallel to the longitudinal axis X.

The central cylinder 302a is movably mounted in rotation on the chassis 402 about its axis 12a. In the embodiment of the invention shown in FIG. 3, the central cylinder 302*a* is mounted in a through bore in the chassis 402.

Each lateral cylinder 302*b-c* is movably mounted in rotation on the associated fan cowl 208 about its axis 12*b-c*, in this case by means of a bracket 208*a* that is integral with the fan cowl 208 and exhibits, for each lateral cylinder 302*b-c*, a through bore in which said lateral cylinder 302*b-c* is mounted.

In the closed position, the central cylinder 302*a* is above the lateral cylinders 302*b-c* but a different arrangement with vertical offset, for example, or even reversed positions, is equally possible.

Figure 5:
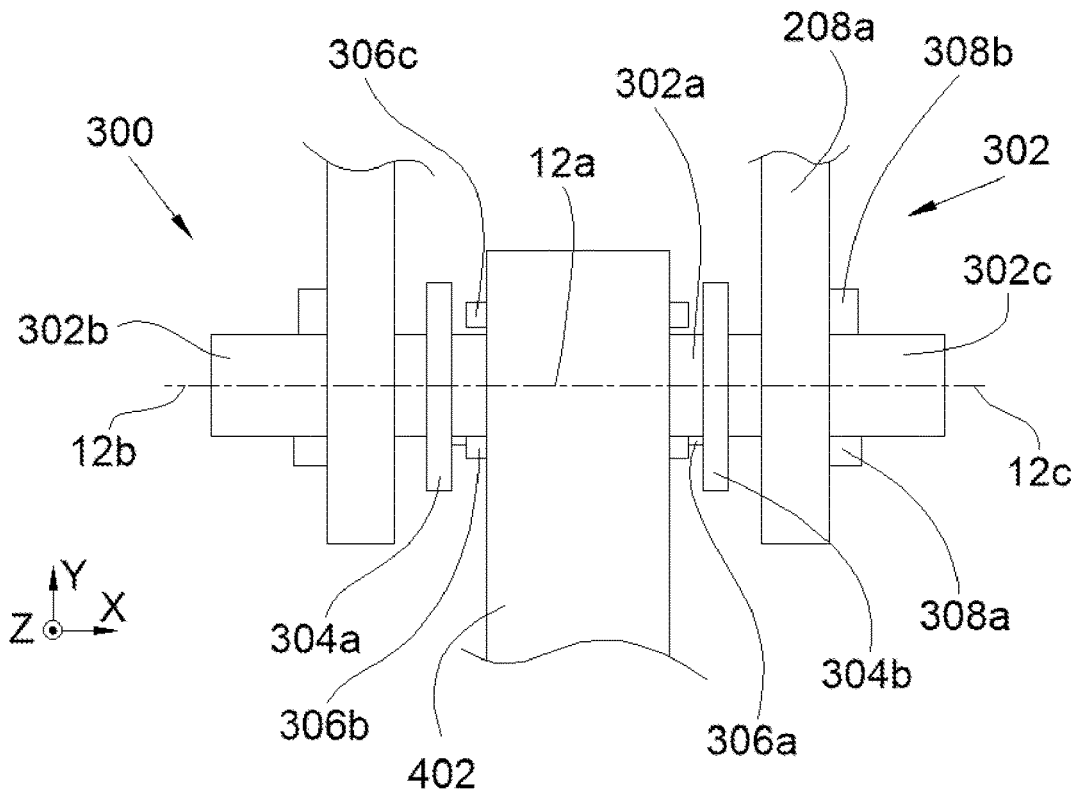
FIG. 5 is a top view of the articulation system according to the invention.

FIG. 5 shows the articulation system 300 in a top view with the two lateral cylinders 302*b-c* on either side of the central cylinder 302*a*.

The articulation system 300 comprises blocking means 306 that are arranged to limit the rotation of the central cylinder 302*a* relative to the chassis 402 between a first position corresponding to the closed position of the fan cowl 208 and a second position corresponding to an intermediate position of the fan cowl 208 between the closed position and the open position of said fan cowl 208, in which the fan cowl 208 is laterally offset towards the side corresponding to said fan cowl 208.

In other words, the fan cowl 208 on the starboard, respectively port, side is offset laterally towards the outside, in other words towards the starboard, respectively port, side to reach its intermediate position by rotating the central cylinder 302*a* from its first position into its second position.

The articulation system 300 comprises stopping means 308 that are arranged to allow the rotation of the fan cowl 208 in respect of each lateral cylinder 302*b-c* between a first position corresponding to the intermediate position of the fan cowl 208 and a second position corresponding to the open position of the fan cowl 208 and to prevent the rotation of the fan cowl 208 beyond the intermediate position when coming from the open position.

The opening principle of the fan cowl 208 therefore involves, from the closed position, laterally moving the fan cowl 208 to starboard for the starboard fan cowl 208, and to port for the port fan cowl 208, in order to reach the intermediate position. The lateral movement involves a rotation about the central cylinder 302*a*. The fan cowl 208 is then moved in rotation about the lateral cylinders 302*b-c* to reach the open position.

Conversely, the closing principle of the fan cowl 208 involves, from the open position, moving the fan cowl 208 about the lateral cylinders 302*b-c* from the open position to the intermediate position, then laterally moving the fan cowl 208 to port for the starboard fan cowl 208, and to starboard for the port fan cowl 208, in order to reach the closed position.

Thanks to the offset between the central cylinder 302*a* and the lateral cylinders 302*b-c*, the fan cowl 208 shifts laterally moving away from the other fan cowl 208 or the upper cowl 211, thereby allowing it to open or close without the risk of interactions.

In the embodiment of the invention shown in FIGS. 3 to 10, the blocking means 306 are composed of a first blade 306*a* integral with the shaft 302 and two first pins 306*b-c* integral with the chassis 402. The two first pins 306*b-c* are arranged on either side of the first blade 306*a* and one of the first pins 306*b* is arranged so that the first blade 306*a* abuts against it in the closed position of the fan cowl 208 and the other of the first pins 306*c* is arranged so that the first blade 306*a* abuts against it in the intermediate position of the fan cowl 208.

In the embodiment of the invention shown in FIGS. 3 to 10, the stopping means 308 are composed, in this case for each lateral cylinder 302*b-c*, by a second blade 308*a* integral with the shaft 302 and by a second pin 308*b* integral with the fan cowl 208, in this case the bracket 208*a*. The second pin 308*b* is arranged in such a manner that the second blade 308*a* abuts against it in the intermediate position of the fan cowl 208. The open position of the fan cowl 208 is determined by the maximum rotation that the fan cowl can make about the lateral cylinders 302*b-c*.

Figure 6:
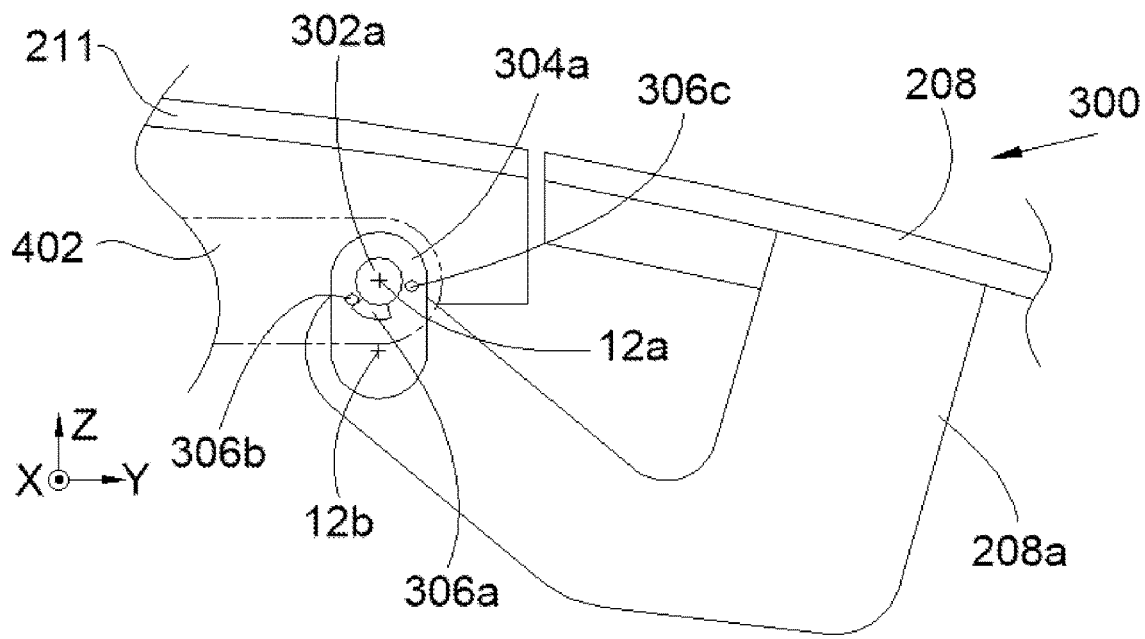
FIG. 6 is a cross-sectional view of the articulation system in FIG. 5 along line VI-VI in the closed position.
Figure 7:
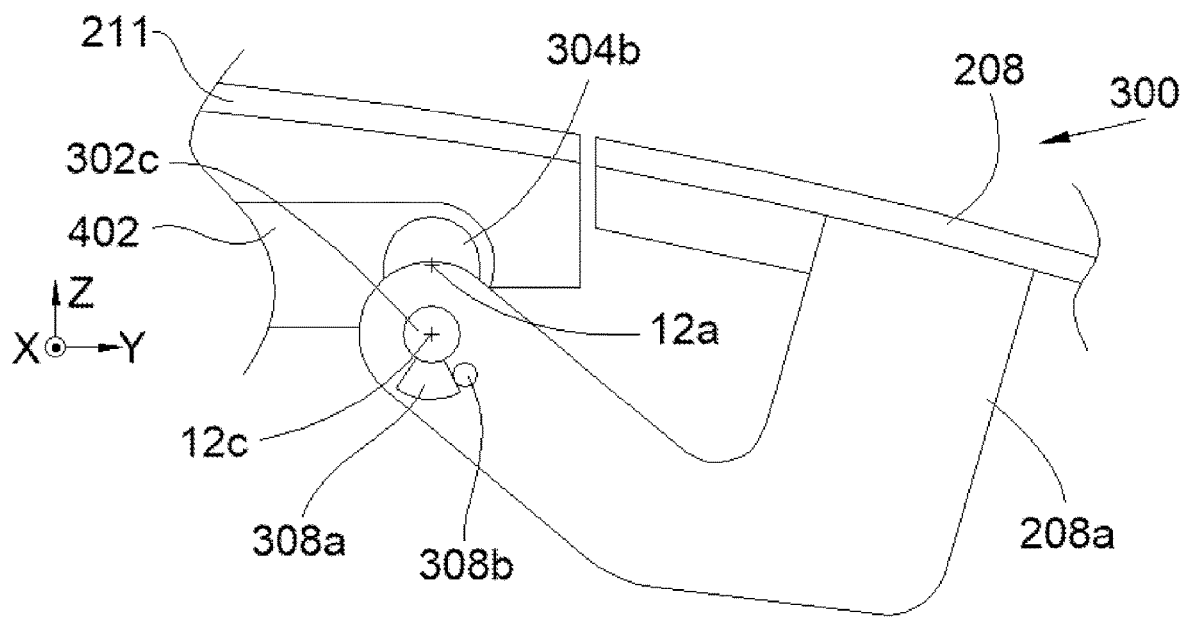
FIG. 7 is a side view of the articulation system in FIG. 5 in the closed position.

FIG. 6 shows the blocking means 306 in the closed position of the fan cowl 208 and FIG. 7 shows the stopping means 308 in the closed position of the fan cowl 208.

Figure 8:
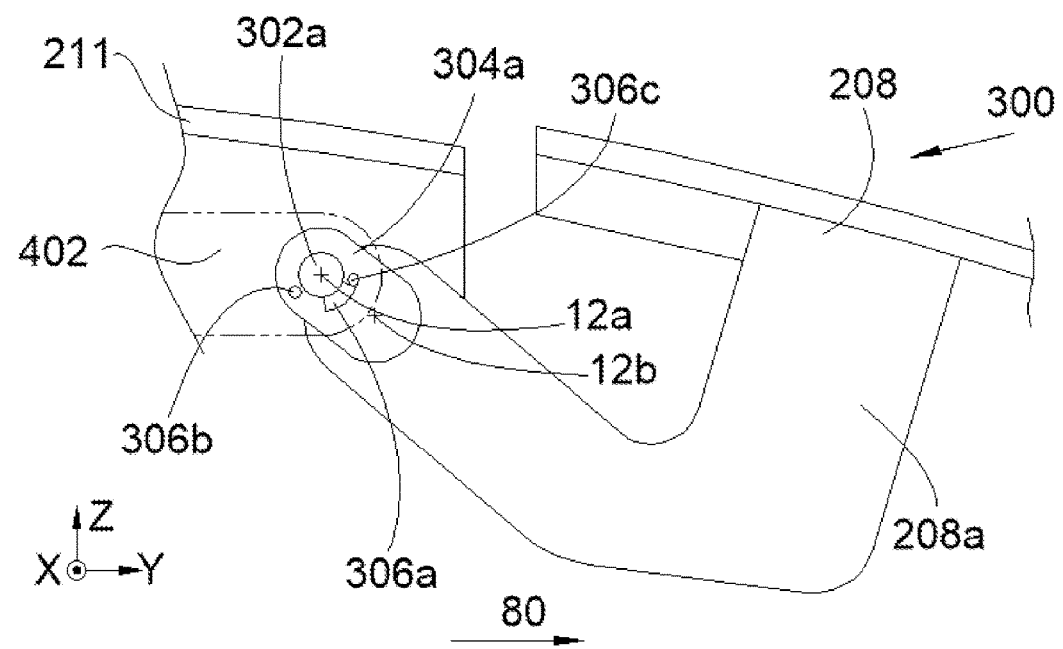
FIG. 8 is a cross-sectional view of the articulation system in FIG. 5 along line VI-VI in an offset position.
Figure 9:
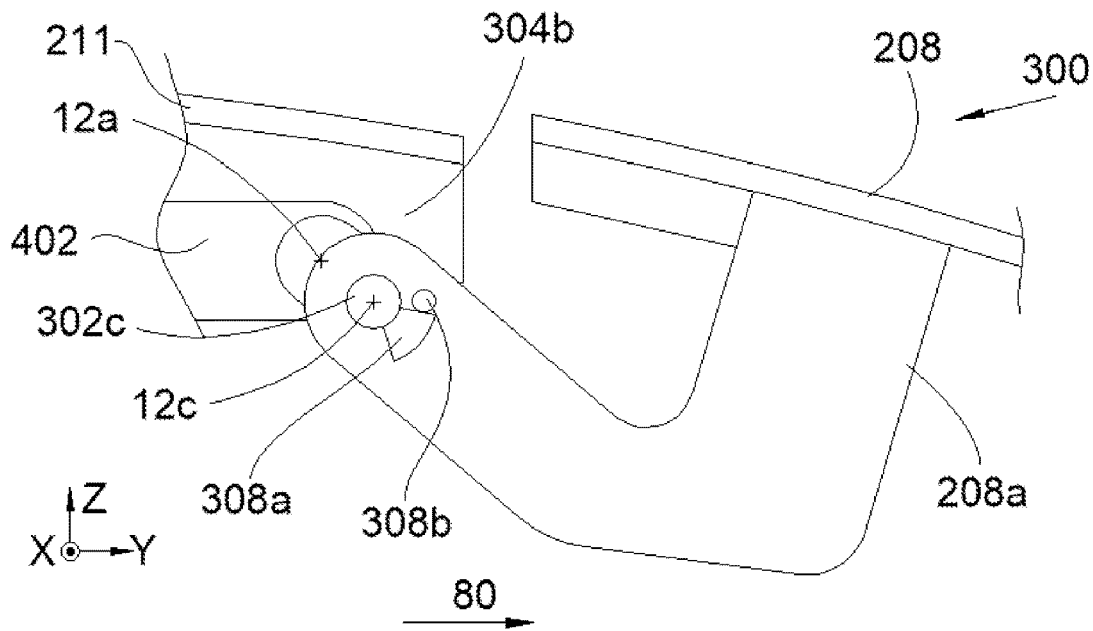
FIG. 9 is a side view of the articulation system in FIG. 5 in an offset position and FIG. 10 is a side view of the articulation system in FIG. 5 in the open position.

FIG. 8 shows the blocking means 306 in the intermediate position of the fan cowl 208 and FIG. 9 shows the stopping means 308 in the intermediate position of the fan cowl 208.

Figure 10:
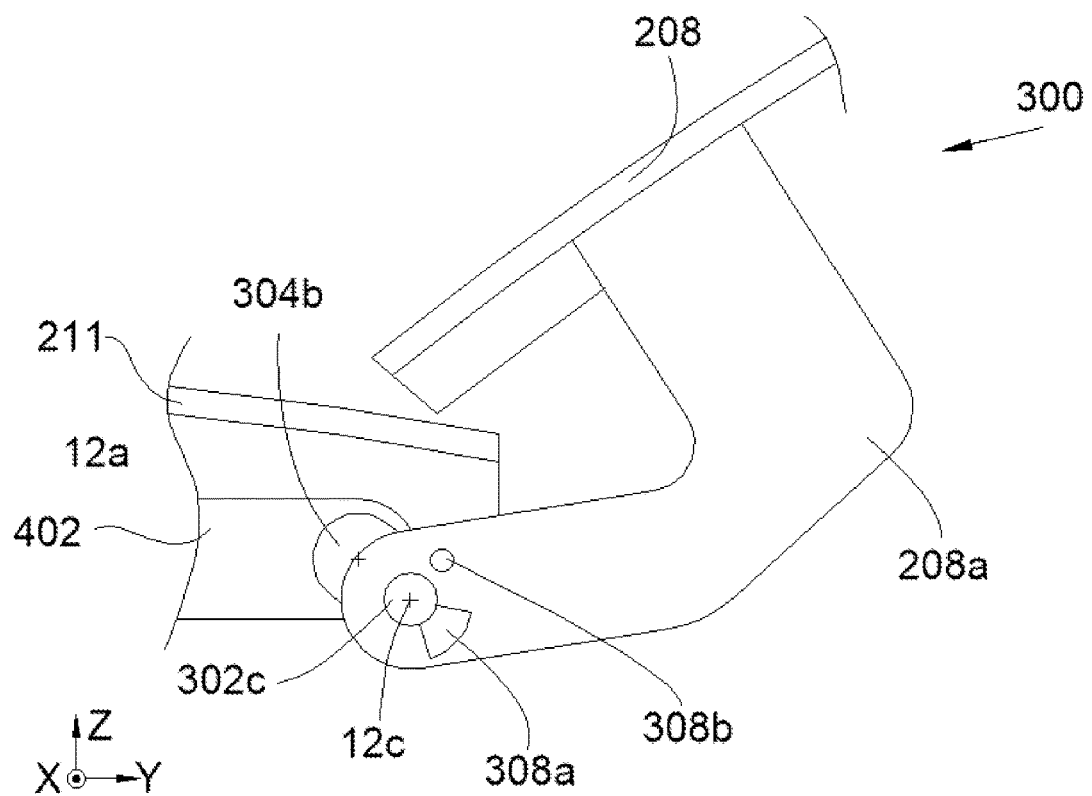

FIG. 10 shows the stopping means 308 in the open position of the fan cowl 208.

In the closed position (FIG. 6), the first blade 306*a* abuts against the first pin 306*b*, which is arranged in this case on the side opposite the fan cowl 208, in other words, starboard for the port fan cowl 208 and port for the starboard fan cowl 208.

In the closed position (FIG. 7), the second blade 308*a* abuts against the second pin 308*b* which is located in this case on the same side as the fan cowl 208, in other words, starboard for the starboard fan cowl 208 and port for the port fan cowl 208.

The transition to the intermediate position (FIG. 8) involves moving the fan cowl 208 laterally (arrow 80) until the first blade 306*a* abuts against the other first pin 306*c*, which is arranged in this case on the same side as the fan cowl 208, i.e. starboard for the starboard fan cowl 208 and port for the port fan cowl 208.

During the transition to the intermediate position (FIG. 9), the stopping means 308 remain in the same position, except that they have pivoted about the central cylinder 302*a*.

The transition to the open position (FIG. 10) involves rotating the fan cowl 208 about the lateral cylinders 302*b-c*, causing the detachment of the second pin 308*b* from the second blade 308*a*, while the blocking means 306 remain in the same position (FIG. 8).

Conversely, from the open position (FIG. 10) of the fan cowl 208, said fan cowl is rotated about the lateral cylinders 302*b-c* until the second pin 308*b* is brought into abutment against the second blade 308*a* (FIG. 9), while the blocking means 306 remain in the same position (FIG. 8), in order to reach the intermediate position of the fan cowl 208.

The transition from the intermediate position to the closed position (FIG. 6) involves moving the fan cowl 208 laterally (opposite direction to arrow 80) until the first blade 306*a* abuts against the first pin 306*b* arranged on the side opposite the fan cowl 208, while the stopping means 308 remain in the same position (FIG. 7), with rotation about the first cylinder 302*a* nearby.

The positions of the pins in respect of the blades may vary depending on the configuration, for example if the blade is oriented upwards rather than downwards, as shown here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft, said propulsion system comprising:
   a chassis,
   a nacelle comprising two fan cowls,
   for each fan cowl, at least one articulation system fixed between the chassis and said fan cowl, so as to move said fan cowl between a closed position and an open position, and between the open position and the closed position, and
   for each fan cowl, a locking means configured to assume, alternately, a locked position in which the locking means locks said fan cowl on the chassis in the closed position and an unlocked position in which the locking means does not lock said fan cowl on the chassis,
   wherein each articulation system comprises:
   a shaft comprising a central cylinder with an axis and at least one lateral cylinder, each with an axis, wherein the central cylinder is movably mounted in rotation on the chassis about the axis of the central cylinder, wherein said at least one lateral cylinder is movably mounted in rotation on the fan cowl about the axis of said at least one lateral cylinder, and wherein axes of each lateral cylinder are coaxial and parallel but distinct from the axis of the central cylinder,
   blocking means configured to limit the rotation of the central cylinder relative to the chassis between a first position corresponding to the closed position of the fan cowl and a second position corresponding to an intermediate position of the fan cowl in which the fan cowl is laterally offset from the side corresponding to said fan cowl, and
   stopping means configured to allow rotation of the fan cowl relative to said at least one lateral cylinder between a first position corresponding to the intermediate position of the fan cowl and a second position corresponding to the open position of the fan cowl and to prevent the rotation of the fan cowl beyond the intermediate position when moving from the open position, wherein the blocking means comprises a first blade integral with the shaft and two first pins integral with the chassis, wherein the two first pins are arranged on either side of the first blade, wherein one of the two first pins is configured in such a manner that the first blade abuts against said one of the two first pins in the closed position of the fan cowl, and wherein the other of the two first pins is configured in such a manner that the first blade abuts against said other of the two first pins in the intermediate position of the fan cowl.

2. The propulsion system according to claim 1, wherein the stopping means comprise a second blade integral with the shaft and a second pin integral with the fan cowl and wherein the second pin is configured in such a manner that the second blade abuts against the second pin in the intermediate position of the fan cowl.

3. An aircraft comprising:
   an engine, and
   the propulsion system according to claim 1, wherein the engine is integral with the chassis and housed inside the nacelle.

* * * * *